Figure 5:
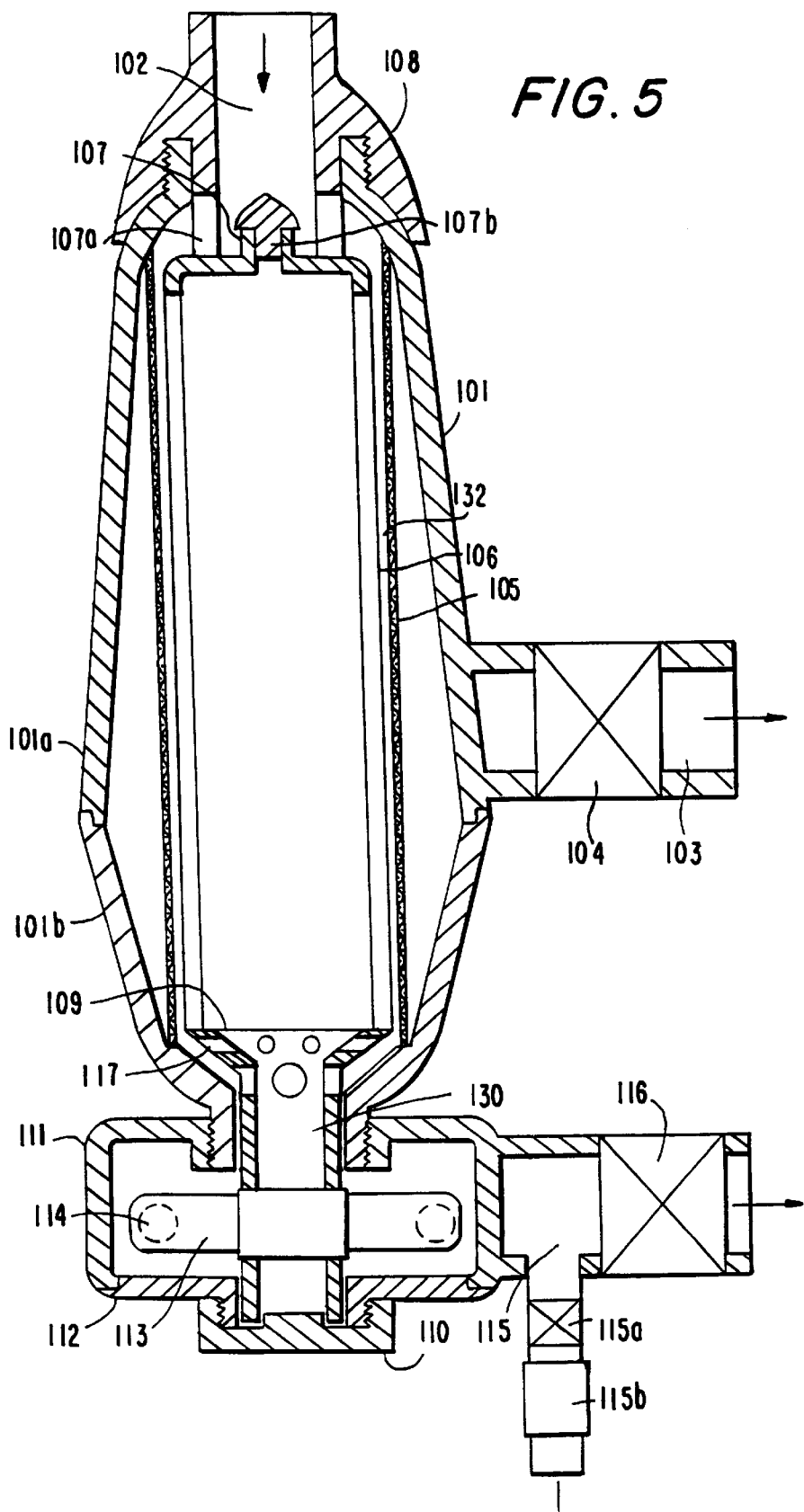

United States Patent

Goodman

[11] Patent Number: 6,155,430
[45] Date of Patent: Dec. 5, 2000

[54] FILTER

[75] Inventor: Geoffrey Goodman, Zfar, Israel

[73] Assignee: Hoshen Water Technologies Ltd., Katzrin, Israel

[21] Appl. No.: 09/257,514

[22] Filed: Feb. 25, 1999

Related U.S. Application Data

[63] Continuation-in-part of application No. PCT/US97/16197, Aug. 26, 1997, and a continuation-in-part of application No. PCT/US97/17079, Sep. 30, 1997.

[30] Foreign Application Priority Data

| Sep. 2, 1996 | [IL] | Israel | 119182 |
| Oct. 1, 1996 | [IL] | Israel | 119337 |

[51] Int. Cl.$^7$ ............ B01D 35/22; B01D 29/62; B01D 29/64; B01D 29/94
[52] U.S. Cl. ............ 210/355; 210/405; 210/408; 210/409; 210/414; 210/415; 210/456; 210/497.01
[58] Field of Search ............ 210/767, 304, 210/306, 308, 407, 456, 497.01, 791, 796, 774, 405, 408, 409, 186, 355, 414, 415, 413

[56] References Cited

U.S. PATENT DOCUMENTS

| 360,441 | 4/1887 | Howes . |
| 2,125,532 | 8/1938 | Wells . |
| 2,275,958 | 3/1942 | Hagel . |
| 2,606,663 | 8/1952 | Blackman et al. . |
| 2,835,390 | 9/1958 | King . |
| 2,858,941 | 10/1958 | Darnell . |
| 3,862,035 | 1/1975 | Goodman . |
| 3,898,157 | 8/1975 | Hooper . |
| 3,959,140 | 5/1976 | Legras . |
| 3,997,441 | 12/1976 | Pamplin, Jr. . |
| 4,042,504 | 8/1977 | Drori . |
| 4,060,483 | 11/1977 | Barzuza . |
| 4,268,381 | 5/1981 | Hooper . |
| 4,315,820 | 2/1982 | Mann et al. . |
| 4,642,189 | 2/1987 | Hooper . |
| 4,832,832 | 5/1989 | Fujiwara et al. . |
| 4,966,701 | 10/1990 | Goodman et al. . |
| 5,000,842 | 3/1991 | Ljokkoi . |
| 5,076,942 | 12/1991 | Goodman et al. . |
| 5,152,891 | 10/1992 | Netkowicz et al. . |

FOREIGN PATENT DOCUMENTS

| 2511632 | 9/1976 | Germany . |
| 7714389 | 2/1978 | Netherlands . |
| 8201666 | 5/1982 | WIPO . |

*Primary Examiner*—Thomas M. Lithgow
*Attorney, Agent, or Firm*—Davidson, Davidson & Kappel, LLC

[57] ABSTRACT

The invention provides a clog-resistant filter for separating solids from liquids, of the type wherein the liquid is passed from a filter inlet through a circular-section hollow filter element the filter being provided with means for the discharge of collected solids during filter operation, the filter comprising a housing provided with an inlet for the liquid to be filtered and provided with a first outlet for filtrate and with a second outlet for liquid containing a high concentration of solids, a hollow filter element insertable into the housing, the internal side of the filter element being in fluid connection with the inlet and the external side of the filter element being in fluid connection with the first outlet, a textured volume reduction device inserted in the filter element and being of a size and shape so as to occupy a major portion of the hollow of the filter element, the volume reduction device having a textured outer surface, the outer surface of the volume reduction device and the internal side of the filter element defining a space within the housing, wherein an incoming liquid stream flowing in the space between the filter element and the textured outer surface of the volume reducing device interacts with the textured surface to create a designed and controlled turbulence in a deliberate manner to prevent clogging of and for cleaning the internal side of the filter element, and a pressure-reduction device in fluid connection with the second outlet and provided with discharge means for solids and for the liquid in which they are entrained, whereby solid particles reaching the second extremity are swept out into the pressure-reduction device.

22 Claims, 3 Drawing Sheets

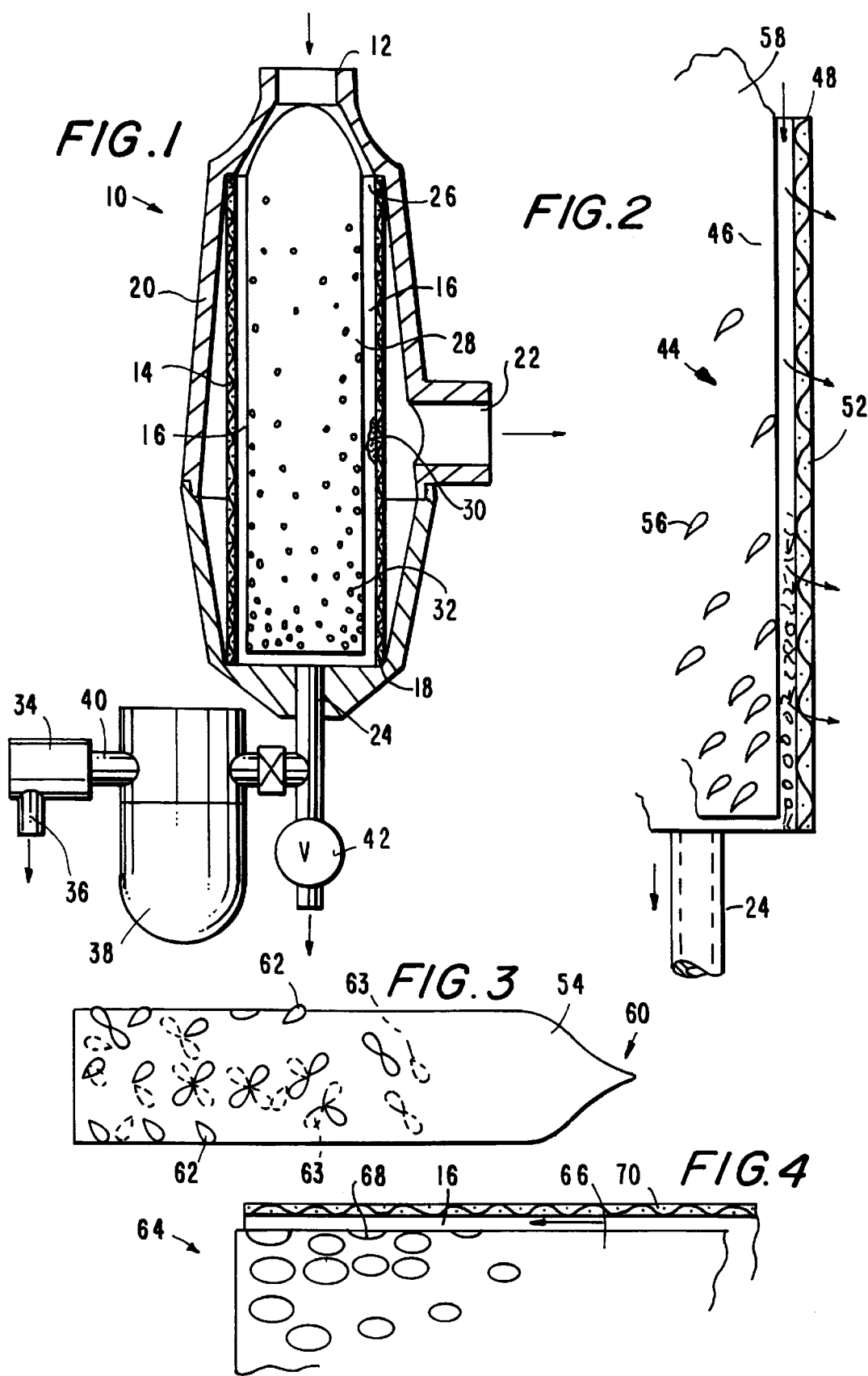

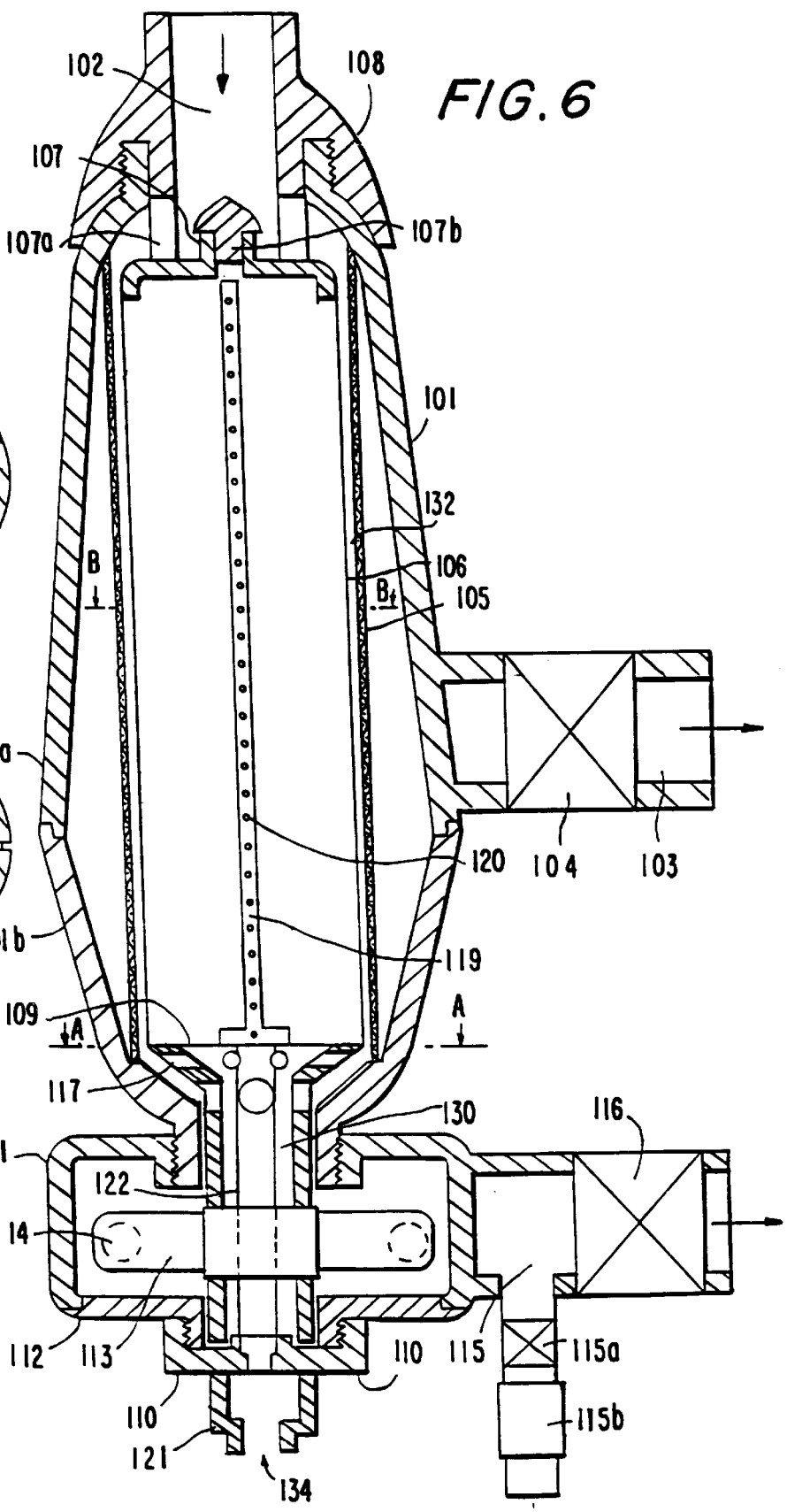

ns which are cleaned by one or more
FILTER

This application is a continuation-in-part of International Application No. PCT/US97/16197, filed Aug. 26, 1997 and a continuation-in-part of International Application No. PCT/US97/17079, filed on Sep. 30, 1997, the disclosures of which are hereby incorporated by reference.

The present invention relates to a filtration apparatus and a method for the separation of a fluid-solids mixture. More particularly, the invention provides means to allow a filtration process to continue for long periods, without clogging, by removing solids, including those of a biological composition, from the filter medium by turbulent flow and discharging these solids entrained in a small quantity of liquid and by periodic flushing.

Filtration processes are widely used in industrial, chemical, municipal and agricultural systems. With the increasing adoption of drip-irrigation methods in agriculture, there has arisen a demand for better filtration of irrigation water. Improved filtration is essential for the satisfactory operation of drip-irrigation tubes, as these include fine passages and the clogging thereof with solid particles will result in failed crops. While in industrial environments a preventive maintenance program will include regular filter cleaning, in agriculture filters are likely to be widely dispersed and less likely to be serviced. Such conditions call for a filter unit of the type which can operate reliably for long periods without servicing.

In some types of liquid filters, the input stream requiring filtration is directed to flow parallel to and along the face of the filter element through which it is passed in order to produce a filtrate of desired quality. As a result, some or most of the solids which are retained by the filtering process are swept to the far end of the filter, where they tend to accumulate. Deflectors are known which may be placed so as to increase the speed and force of the incoming parallel flow stream, and consequently its washing action.

The solid material retained inside the filter element and driven to the far end of the filter is not completely at rest. A backflow caused by local turbulence may return retained solids upstream. Thus, even if the washing action initially prevents or delays blockage of the filter screen, a gradual increase in concentration of material in the vicinity of the latter increases the probability of eventual deposition of retentions on the screen and of them being forced into or even out through the screen orifices. This may lead to a gradual loss of output pressure and flow and a need to clean the filter element. The necessity to clean the filter may be delayed by periodic flushing out of the accumulated retentions through a manual or automatic flushing valve. Also, deposits on the proximal wall of the filter element may be loosened by hydraulic shock and by the increased flow caused by valve opening. However, under difficult conditions such flushing does not prevent relatively rapid clogging of the filter.

In U.S. Pat. No. 3,862,035 the present inventor disclosed a means to minimize accumulation of free or deposited solids in a filter by continually removing them without interrupting liquid flow through the filter, thus reducing costs associated with regular maintenance, with pressure loss, with filter shut-down and investment in backup filtration. Generally, the latter invention comprised pressure-reducing means ("bleed") in communication with the filter body, or within the latter, said bleed continuously discharging a small portion of the liquid flowing through the filter, together with solids retained by the filter element at a pressure substantially less than that within the filter, while the energy made available by the pressure reduction was either to be dissipated by means of the friction provided by the discharge path, or by using such energy for operating a hydraulic device placed within or without the filter.

Various embodiments of the invention have greatly increased the working cycle of filters and improved quality of filtration by lessening eventual penetration of solids previously retained through the orifices of the filter screen, whether smaller than or similar in size to the orifices, and of larger particles worn down by repeated turbulence-induced particle—particle and particle—filter impact. Despite the benefits provided by the latter invention, clogging and eventual blockage of the screen could still be caused by indeterminate movement of particles close to the filter screen at its far end, by turbulent return of some retentions upstream in the filter and by a particularly heavy concentration of or by sudden spurts of solids in the incoming stream. Increasing discharge flow through the bleed means, in order to cope with the latter, is sometimes not practical or economically efficient.

In U.S. Pat. No. 4,966,701 (and its division, U.S. Pat. No. 5,076,942) the present inventor presented a simple and cost-effective answer to the problems described. It provides a static volume reduction device which is disposed in such a manner and which is of such a shape designed to minimize the volume of unfiltered liquid within the filter housing and, in particular, between the filtering side of the filter element and the wall of the device.

In conjunction with periodic operation of the manual or automatic flushing valve provided by the invention and the pressure-reducing discharge means, superior filtration and a greatly lengthened working cycle are achieved. In most conditions, operation of the volume reducing device considerably improves the effectiveness for cleaning of the hydraulic shock and of the added drag that is caused by the sudden increase in speed of the incoming liquid flow along the screen after opening the flushing valve.

In general, the integration of volume reduction device (VRD) with continual discharge through pressure reducing means and blow-out flushing as needed, as described in said U.S. Patents, is most effective, resulting often in working cycles of weeks, or even months without having to cease filtration. Alternatively, the invention may be exploited primarily to reduce to a minimum the amount of continuously discharged liquid.

Despite the general effectiveness of the inventions referred to above, a considerable proportion of material of biological origin in the liquid to be filtered presents a specific challenge to the filter, regardless of whether the material is natural or industrial in origin. This may be caused by the composition, shape, pliability or surface characteristics (such as stickiness) of biological particles or substances (such as mucoid exudations), or a combination of the latter alone, or in interaction with inorganic substances present in the liquid.

Such materials and interactions can lead to rapid clogging of any kind of filter screen, whatever the construction or shape of orifice provided, and can cause great difficulties in cleaning the screen. In the absence of, or to avoid the use of screens in such conditions, these problems were historically met by such means as gravity or pressure-induced deep bed filtration and batch, flocculation-induced settlement of solids in relatively simple mechanical systems.

More recently, filters have been developed for such conditions, using screens which are cleaned by one or more of several methods including scraping, suction, brushing and jet-spraying. These are usually dynamic systems, requiring relatively expensive, often quite complex, hydraulic and electromechanical engineering, which in turn require suitable maintenance and other support.

It is an object of the present invention to provide a filter with a longer work cycle which operates without clogging for a longer period than prior art filters.

A further object of the present invention is to provide a filter for conditions in which the biological material in the liquid to be filtered is particularly problematic.

Yet another object is to provide a filter embodying a device which is technically simple and easy to make, convenient to operate and maintain and thereby cost-effective.

It is more specifically an object of the present invention to provide a filter in which turbulence is used in a controlled manner to assist cleaning of the filter screen during operation and during flushing. In this method, a volume reduction device of the kind described in U.S. Pat. No. 4,966,701 having variations on its outer surface is provided. These variations may be protuberant and/or indented, in relief or with depth, continguous or continuous, regular or irregular in shape and distribution and in any number and configuration required to achieve the object of the invention and such modified TVRDs having textured turbulence-creating outer surfaces will be referred to hereinafter by the abbreviation "TVRD".

The incoming liquid stream flowing parallel to and between the filter screen and the TVRD interacts with the surface of the latter. The nature of the resulting turbulence is a function of the speed of flow and the configuration of the volume reduction device surface. While in most engineering applications surface roughness of flow channels is kept as low as possible, the present invention utilizes the known effect of surface roughness to deliberately create turbulent flow in the latter part of the filter. The turbulence will be less, or even non-existent, when water flow is relatively slow and much greater when flow is increased, e.g., during valve flushing. Furthermore, the kind of turbulence will depend on the degree and kind of texturing at any particular point on the TVRD surface.

It will be understood that during filter operation and in the absence of flushing, maintenance of laminar, non-turbulent flow at the near end of the filter will enhance sweeping of retentions to its far end. This minimizes the possibility of local turbulence driving solids at the filter screen and possibly into or through the screen orifices.

Accordingly, in one embodiment of the invention, few or no surface irregularities are placed on the TVRD at the inflow end of the filter. However, such irregularities are gradually increased in number and/or depth, though not necessarily at a constant rate, towards the far end of the TVRD. Thus, during filtering turbulence is gradually and slightly increased along the screen to balance the gradual decline in flow speed due to the outflow through the screen and much more increased during flushing, when speed of flow is both increased and maintained along the full length of the screen and the TVRD.

At the far end of the filter, there is an increased tendency for particle deposition on the screen due to an increasing concentration of solids at this location, and also to the more random movement of suspended solids that results from decreased speed of flow. Accordingly, at the far end of the filter increased and controlled turbulence becomes more of an advantage than a disadvantage, and here the TVRD has maximum surface changes. The result is to delay or prevent the tendency of retentions in "wash" filters to deposit first and foremost on the far end of the filter screen. This is particularly effective in conjunction with bleed discharge.

During flushing, the TVRD causes a violent turbulence, particularly at the far end of the screen where the heaviest deposits are usually found.

The present invention achieves the above objectives by providing a clog-resistant filter for separating solids from liquids of the type wherein said liquid is passed from a filter inlet through a circular-section hollow filter element, said filter being provided with means for the discharge of collected solids during filter operation. The filter comprises:

a) a housing provided with an inlet for the liquid to be filtered and provided with a first outlet for filtrate and with a second outlet for liquid containing a high concentration of solids;

b) a hollow filter element insertable into said housing, the internal side of said filter element being in fluid connection with said inlet and the external side of said filter element being in fluid connection with said first outlet;

c) a textured volume reduction device inserted in said filter element and being of a size and shape so as to occupy a major portion of the hollow of said filter element, said volume reduction device having a textured outer surface, said outer surface of said volume reduction device and said internal side of said filter element defining a space within said housing, wherein an incoming liquid stream flowing in said space between said filter element and said textured outer surface of said volume reducing device interacts with said textured surface to create a designed and controlled turbulence in a deliberate manner to prevent clogging of and for cleaning the internal side of said filter element; and d) a pressure-reduction device in fluid connection with said second outlet and provided with discharge means for solids and for the liquid in which they are entrained, whereby solid particles reaching said second extremity are swept out into said pressure-reduction device and said filter may operate for extended periods without attention during which time clogging of the filter element is inhibited.

In a preferred embodiment of the present invention there is provided a filter wherein said textured turbulence-creating outer surface is configured to allow laminar flow near said first outlet and to cause a relatively greater and controlled turbulent flow near said second outlet.

In a further preferred embodiment of the present invention said textured surface is adapted to cause turbulent flow along the whole length of said filter element during filter flushing.

In a first configuration of the present invention there is provided a filter wherein said textured surface has surface projections.

In a second configuration of the present invention there is provided a filter wherein said textured surface has surface indentations, and in a third configuration of the present invention there is provided a filter wherein said textured surface has a combination of both surface indentations and surface projections.

Thus, a given textured surface can be provided with projections, indentations or combinations thereof, said projections and/or indentations being regular or irregular in shape, size, pattern or distribution.

The hollow filter element used in the present invention can be a single unitary perforated element, or formed from a stack of filtering rings.

Yet further embodiments of the apparatus of the invention will be described hereinafter.

The present invention also provides for a four-step method of filtering solids from liquids, comprising the steps:

a) flowing a solid-entrained liquid into a narrow flow passage formed between a filter element and a textured volume reduction device having a textured turbulence-creating outer surface for creating a designed and controlled turbulence in a deliberate manner to prevent clogging of for cleaning the internal side of said filter element;

b) separating the solid constituent from said liquid by allowing said liquid to pass through said filter element while solid constituents are retained thereby;

c) discharging liquid passing through said filter element through a first outlet conduit; and d) continually discharging at reduced pressure said solid constituents, together with a small quantity of entraining liquid through a second outlet.

In preferred embodiments of the present invention said method further comprises periodically discharging said solid constituents through a valve.

In another preferred embodiment of the present invention there is provided a method for filtering solids from liquids, comprising the steps:

(a) inserting the solid-entrained liquid into an inlet of a housing;

(b) flowing the solid-entrained liquid from said inlet into a narrow space formed in said housing between a filter element and a textured rotatable volume reduction device; and (c) rotating the textured volume reduction device so as to facilitate cleaning of said filter element.

The concentrated solution leaving the filter during continual or periodic flushing can be passed either to a drain or to a storage tank. The latter is advantageous when a contaminating fluid such as a fuel is being processed, and allows for inspection or analysis of the solid constituent, which is likely to provide indication of process variables requiring correction. Furthermore, in some usages the collected solid may have commercial value.

In one embodiment of the invention a discharge valve for entrained solids is powered by the pressure-reducing means in a hydraulically operated mechanism as described in U.S. Pat. No. 3,862,035, the teachings of which are incorporated herein by reference.

Discharge of liquid-entrained solids may be carried out continually and/or by periodic valve discharge, the shock of valve opening making a valuable contribution to dislodging cake from the surface of the filter element.

The TVRD, in conjunction with a bleed device and valve flushing provides an inexpensive and simple means of obtaining better filtration with longer working cycles even in the presence of a high proportion of organic solids in the liquid to be filtered. However, this may not be adequate under more difficult conditions, particularly when long working cycles are a critical specification and when economic conditions justify a modest further expense.

There is thus a widely recognized need for, and it would be highly advantageous to have, a method and filter in which filtration and separation of solids of all kinds from an in-flowing liquid stream, even when present in a high concentration and adhesive, is made possible for long periods without clogging.

U.S. Pat. Nos. 4,966,701 and 5,076,942 provide a static volume-reducing device which enables a faster, more efficient evacuation of filter-retained solids from within the filter, whether by way of bleed or periodic valve flushing or both, to assist cleaning of screens during filtering and flushing.

U.S. Pat. No. 3,862,035 teaches that the energy made available by reduction in pressure of a liquid stream discharged from a filter to the atmosphere can be used to power a liquid-operated mechanical device placed within or outside the filter housing.

Thus, it would be further advantageous to have a method and filter in which the textured volume-reducing device is fitted so that it may be rotated by virtue of the energy derived from the constant or periodic evacuation of liquid from within the filter to atmosphere through a dynamic pressure-reducing device, as envisaged in U.S. Pat. No. 3,862,035, the teachings of which are incorporated herein by reference, or is rotated electro-mechanically.

It would be further advantageous to have such a method and filter which include a textured rotatable volume-reduction device bearing orifices from which clean liquid from a high pressure source can be sprayed onto the upstream side of the filter screen, and/or bearing brushes in contact with the screen during rotation.

It would be further advantageous to have means whereby liquid at high pressure is used to rotate a textured volume-reducing device, alone or together with one or more other sources of power.

Thus, in another aspect of the present invention there is provided a clog resistant filter, as hereinbefore defined, for separating solids from liquids, comprising:

(a) a housing provided with: an inlet for the liquid to be filtered; a first outlet for filtrate; and a second outlet for liquid containing a high concentration of solids;

(b) a hollow filter element inserted into said housing, the filter element having an internal side and an external side, said internal side of said filter element being in fluid communication with said inlet and said external side of said filter element being in fluid communication with said first outlet; said internal side of said filter element defining a chamber;

(c) a textured rotatable volume reduction device inserted in said filter element and being of a size so as to occupy a portion of said chamber, said volume reduction device having a textured outer surface, said outer surface of said volume reduction device and said internal side of said filter element defining a space within said housing, wherein an incoming liquid stream flowing in said space between said filter element and said textured outer surface of said rotatable volume reducing device interacts with said textured surface to create a designed and controlled turbulence in a deliberate manner to prevent clogging of and for cleaning the internal side of said filter element; and (d) a rotator element for rotating said textured volume reduction device.

According to further features in preferred embodiments of the invention described below, the rotator element may include a hydraulic propeller element, including: a hollow pivot element connected to the textured volume reduction device and in fluid connection with the internal side of the filter element; and at least one hollow wing having at least one aperture for evacuation of liquid therethrough, such that evacuation of liquid from within the filter through the at least one aperture causes the propeller element to revolve, thereby revolving the textured volume reduction device.

Alternatively, the rotator element may include a hydraulic propeller element in fluid connection with an external high-pressure liquid source.

Alternatively, the rotator element may include an external electro-mechanical supplier connected to the textured volume reduction device.

A filter of the present invention may preferably be in fluid connection with a static pressure reduction device as disclosed in U.S. Pat. No. 3,862,085, and with a discharge valve operated manually or automatically.

According to additional features of the described preferred embodiments, the textured rotatable volume reduction device may include two closed ducts running its length just beneath its surface, each placed diametrically opposite to the other, each of the ducts featuring a plurality of micro-vents so as to allow spraying of fluid at high pressure over the internal side of the filter element.

Such embodiment may further include a pipe installed centrally through the pivot of the propeller element, the pipe being in fluid connection with the ducts and with an external high pressure liquid source.

Further, the textured rotatable volume reduction device may feature two slots along its length wherein thin brushes are mounted, each placed opposite the other and being free to move towards and away from the filter element.

According to the present invention there is further provided a method for inhibiting clogging of a filter during separation of a solid and liquid constituent from a solid-entrained liquid, the method comprising the steps of: inhibiting clogging of a filter during separation of a solid and liquid constituent from a solid-entrained liquid, the method comprising the steps of:

(a) inserting the solid-entrained liquid into an inlet of a housing;

(b) flowing the solid-entrained liquid from said inlet into a narrow space formed in said housing between a filter element and a textured rotatable volume reduction device of a size so as to occupy a major portion of said housing, said device having a textured outer surface; and (c) rotating said textured volume reduction device so as to create a designed and controlled turbulence in a deliberate manner to prevent clogging of and facilitate cleaning of said filter element.

The rotation of the textured volume reduction device may be accomplished by evacuation of fluid from within the filter through a hollow hydraulic propeller connected to the textured volume reduction device so as to revolve the propeller, thereby revolving the textured volume reduction device.

Alternatively, the rotation of the textured volume reduction device may be accomplished by using an external electro-mechanical source or an external high-pressure liquid source. Alternatively, the textured volume reduction device may be rotated manually.

According to still further features of the described preferred embodiments, a method according to the present invention may further include the steps of: (a) injecting fluid at high pressure through ducts running the length of the textured rotatable volume reduction device and spraying said fluid over the upstream surface of the filter screen through micro-vents placed along the ducts; and (b) cleaning the filter screen by means of brushes mounted within slots running the length of the textured volume reduction device.

The present invention successfully addresses the shortcomings of the presently known filter designs by providing a filter and method in which filtration and separation of solids of all kinds, including adhesive organic materials, from an in-flowing liquid stream is made possible for long periods without clogging of the filter, and without the need to interrupt the filtration process.

The present invention discloses a novel filter and method in which a textured volume reduction device is rotated by virtue of the energy derived from the constant or periodic evacuation of liquid from within the filter to atmosphere through a dynamic pressure-reducing device and/or a discharge valve.

Further, the present invention provides a rotatable textured volume-reduction device bearing orifices from which clean liquid from a high pressure source can be sprayed onto the upstream side of the filter screen, and/or bearing brushes free to move towards and away from said filter element during rotation.

In U.S. Pat. No. 360,441 to Howes there is disclosed a spiral baffle on a volume reducing flow body which could by one interpretation be considered to have alternating indentations (between the spirals), or projections (defining the spirals). However, referring to column 4, lines 92–103 in the Howes patent, one finds the statement that "In the operation of my improved filtering apparatus the water or liquid enters the chamber E' and passes into the helical channels f, within the filtering cylinders D, thence through the felt or filtering material D' to the chamber G, leaving the dirt and sediment deposited on the inner surface of the felt D'. To remove the dirt from the filter, the waste valve H' is opened, which causes a rapid flow of liquid through the helical channels f, washing off the deposit from the felt and carrying it away through the waste H."

First, it will be realized that the filtering apparatus of Howes requires a separate site for removing the dirt from the filter. Secondly, said step is achieved by the force of a rapid, but relatively laminer flow, through the helical channels along the full length of the filter, caused by the openings of the waste valve. In contrast, the present invention achieves a simultaneous filtering step and removal of dirt step by providing a textured designed and controlled turbulence creating outer surface which continuously produces a controlled turbulent flow.

More specifically, the present invention teaches the creation of a planned turbulence by a textured surface specifically designed for this purpose. Howes does not claim that his appartus creates turbulence planned for a specific purpose, rather he states that his apparatus creates "a continuous spiral channel . . . " through which the liquid is directed to flow in contact with the inner surface of the filtering cylinder (an artisan skilled in the art would identify this as "a wash filter"). Centrifugally inclined flow leads to increased deposition of solids on the inner surface of the filter cylinder. The increased deposition is enhanced by the flow which is relatively smooth in the Howes apparatus, as there is no texturing on the shaft, nor is there any on the baffle or its edge.

A detailed assessment of the entire Howes patent suggests that the flow tends to be laminar. Even during the proposed backwash stage, when a reverse flow through the filter-cylinder integrates with the usual flow, the stream would gain a degree of turbulence, but not achieve the controlled turbulence of the present invention.

In DT 2511632 to Renz there is described a device for the separation of suspended and/or dissolved substances from liquids which includes a rotor which may have surface projections.

Increasing the speed of flow at and along the face of a filter screen has long been regarded as a means to try to clean off the deposits which continually settle on it during filtration. The increased speed generates additional turbulence at a very short distance from the screen, due to interaction between the unevenness of the screen surface itself and the deposits on it on the one hand and the flowing medium on the other. The turbulence is a chaotic expression of the increased energy and internal disorder in the flow resulting from the increased speed of flow and it provides random, multi-directional forces acting on the screen deposits. These forces tend to remove the latter, but often this is not efficient. Worse still, random directions within the uncontrolled turbulent streams usually causes dirt to be pushed into and through the screen—particularly, but not only when screen deposits are soft and flexible, which usually means biological.

The means disclosed generally by Renz, including that specific to his Claim No. 13, do not overcome the problems described above and he provides more of the same: increased speed of the fluid flow and of the dirt entrained in it along and at the screen surface. The increased random multi-direction turbulence forces the dirt energetically directly towards the screen and often through it. Furthermore, the device of Claim 13 in particular, imparts a greatly added and chaotic force to the fluid medium itself, causing it to impact on deposits already on the screen, pushing some of them through it and/or breaking them or eroding them to a size capable of penetrating the filter screen.

Renz does not reveal:
a) knowledge of a great need for effective control of the turbulence at the face of the screen;
b) the dangers inherent in not so doing;
c) an intention to provide, directly, indirectly or by implication, a means which overcomes the problems described above; and
d) an invention providing such a solution without having intended it; indeed, the projections he provides on a centrally placed rotating displacement body as described by him, is said to function "with swilling action on filter surface increased by rotor", meaning "to drench in large amounts of water".

Detailed study of the patent shows that 'swilling' the filter surface is indeed what Renz had in mind when describing some of the elements in his unit. Thus, when the input fluid is introduced into the filter it is directed tangentially to the filter screen and the surface of "a motorised displacement body" may have "projections to accelerate the speed of the fluid as it rotates".

Throughout DT 2511632 Renz makes it very clear that for him changing the speed of flow is the sole basis for a change in turbulence; more speed, more turbulence, less speed, less turbulence and he does not mention or suggest controlling the turbulence in a designed manner.

In contradistinction, the surface texturing of the present invention is not intended or designed to increase speed of flow, nor are they designed to swill the filter screen surface, but rather the opposite; that is, they are designed to limit violent uncontrolled turbulence in general and, more specifically, to prevent or greatly reduced multi-directional turbulence at the surface of the screen and, instead, to create designed and controlled turbulence in a deliberate manner to prevent clogging as described herein.

In NL 7714389 by Amafilter BV there is described a filter which is intended solely to separate a thick mass of watery solids from some of its liquid content and is designed accordingly, in order to get rid of the liquid " . . . to yield a product which can be transported more easily."

The central rotating element is variously described as a " . . . compacting worm ejecting through . . . ", as a "coaxial, rotating transporter screw . . . " and as "a driven transporter worm", provided with " . . . worm blades". From this it is clear that the central rotating element has three functions:
a) as a worm screw forcing the solids right through the device-pressure from gravity or hydraulic means not being enough;
b) as a compacting element deliberately forcing the sludge (with the assistance of gas pressure) or pulp against the perforated liner cylinder in order to literally squeeze the waste liquid out through the perforations; and
c) as a scraper to help wipe off solids which could conceivably attach, as a result of function (b), to the inner wall of the perforated liner cylinder.

(It seems that this very onerous task may have additional assistance from the vibrator—in addition to the latter's function of slowly percolating the water held in the compacted mass towards the perforations in the liner cylinder.)

In contradistinction, in the present invention the central rotating element is not intended, neither does it in practice fulfill any of the above functions; instead, it is designed to keep and keeps liquid-borne solids away from the sieve (filtering) element—and it is certainly not a scraper.

Thus, none of said publications teach or suggest the presently claimed filter or the advantages thereof.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:
FIG. 1 is a cross-sectional elevational view of a preferred embodiment of the filter according to the invention;
FIG. 2 is a detail view of an embodiment arranged for organized turbulent flow;
FIG. 3 is a side view of a volume reduction device having regularly arranged projections and indentations;
FIG. 4 is a detail view of a TVRD provided with irregularly arranged indentations;
FIG. 5 is a longitudinal cross-section through a filter being one embodiment of the invention, wherein discharge devices for solids are shown in schematic form;
FIG. 6 is a longitudinal cross-section through a filter being another embodiment of the invention, wherein is incorporated a high pressure liquid spraying means and wherein discharge devices for solids are shown in schematic form;
FIG. 7 is a cross-section (A—A) through the body of the filter shown in FIG. 6; and
FIG. 8 is a cross-section (B—B) through the body of the filter shown in FIG. 6.

There is seen in FIG. 1 a clog-resistant filter 10 for separating solids from liquids, of the type wherein a liquid is passed from a filter inlet 12 through a circular-section hollow filter element 14. Filter 10 is provided with means for the discharge of collected solids during filter operation. A housing 20, shown as a two-part assembly for convenience of access, is provided with an inlet 12 for the liquid to be filtered, with a first outlet 22 for filtrate and with a second outlet 24 for liquid containing a high concentration of solids.

A hollow filter element 14 removably assembled in housing has a first extremity 26 where liquid first contacts filter element and a second extremity 18 furthest from first extremity 26. The internal side of filter element 14 is in fluid connection with inlet 12. The external side of element 14 is in fluid connection with first outlet 22.

A textured volume reduction device 28 is inserted in the space inside the filter element 14, and is of a size and shape to occupy a major portion of said space. The outer surface of device 28 is provided with projections 32 designed so as to create a controlled turbulence.

Advantageously, said projections 32 are arranged to cause controlled turbulent flow along the length of filter element 14 during filter flushing, when liquid flows through both outlet ports 22, 24, or through either port 22 or port 24 alone, such flow helping to dislodge cake 30 from the inner surface of the filter element 14.

As will be noted, there is provided, in this embodiment, a greater density of projections 32 at the downstream end of the TVRD, thereby creating a greater tendency to controlled turbulence at said end 18.

A pressure-reduction device 34 such as that described in U.S. Pat. No. 3,862,035, the teachings of which are incorporated herein by reference, can be used in conjunction with the present invention, and such a device is attached in fluid connection with the second outlet 24, and is provided with discharge means for solids and for the liquid in which they are entrained.

As described in said patent, the device 34 has a discharge outlet 36. A sump 38 connected between second outlet 24 and the inlet 40 of pressure reducing device 34 may optionally be provided. A discharge valve 42 being hand or automatically operable is also connected to the second outlet 24.

In operation, solid particles reaching second extremity 18 are swept out into pressure-reduction device 34, or are discharged through valve 42, or are collected in sump 38. Consequently, the filter 10 may operate for extended periods without attention, during which time clogging of the filter element 14 is inhibited.

With reference to the rest of the figures, similar reference numerals have at least in part been used to identify similar parts.

Referring now to FIG. 2, there is seen a detail of a filter 44 similar to that described with reference to FIG. 1. At slower speeds of flow, the flow tends to be laminar. This laminar flow is beneficial in preventing large particles from being forced into, or through the filter element 52. At faster speeds of flow, turbulence is caused, particularly where there is a greater density of texturing. This is valuable in carrying solid particles for transfer through the second outlet port 24, seen in FIG. 1. The turbulence-creating projections 56 on the textured outer surface of the volume reduction body 58 are positioned and dimensioned to cause a designed, turbulent flow even near the second outlet port 24 where flow rates are naturally low during filter operation.

Seen in FIG. 3 is the textured surface on the volume reduction device 54 formed by both surface projections 62 and indentations 63, regularly arranged in both pattern and distribution along the length of the TVRD.

FIG. 4 illustrates the textured surface of the volume reduction body 66 formed by surface indentations 68, arranged in an irregular pattern.

FIG. 5 illustrates a filter according to the present invention. As shown in the figure, the filter includes a filter housing 101 made in two parts 101*a* and 101*b* for convenience of assembly, the parts being of conventional design. Housing 101 contains an insertable hollow cylindrical filter element 105 featuring an internal side and an external side and bearing numerous orifices. Further, housing 101 contains a rotatable textured volume-reducing device (RTVRD) 106 having a near end, a far end, and an outer surface. Preferably, RTVRD 106 is of a substantially cylindrical shape and occupies the major portion of the internal volume of filter element 105. RTVRD 106 may be substantially hollow or solid, and its outer surface is textured, as shown in FIGS. 1–4. Preferably, filter housing 101 features an inlet 102, a first outlet 103 for filtrate and second 115 and third 116 outlets for discharge of retained solids.

The near end of RTVRD 106 includes a spindle 107 preferably held by a spider centering ring 107*a* within which spindle 107 can rotate, and a hydrodynamically shaped plug 107*b*. Spider centering ring 107*a* is connected to or made as an integral part of an input connector 108 which defines inlet 102.

According to the embodiment shown in FIG. 5, the base 109 at the far end of RTVRD 106 is preferably integral with the pivot 130 of a hollow hydraulic propeller 113. Pivot 130 is held by, and can rotate within, that end of filter housing 101, through which all retained solids are discharged. A passage 117 for fluids and entrained solids provides a fluid connection between the liquid external to RTVRD 106 and hollow pivot 130. On propeller pivot 130 is mounted a at least one, and preferably two, hollow wings of hydraulic propeller 113, the wings being set in a housing 111 which is connected to filter housing 101, or alternatively being an integral but separate part of housing 101. Each of the two propeller wings has one of two contra-positioned fluid outlets 114. For convenience of assembly, the propeller housing 111 preferably bears a lid 112 which in turn carries a propeller pivot cap 110 within which the pivot can rotate. Evacuation of solids-containing liquid from the internal side of the filter through fluid outlets 114 located at the hollow propeller 113 wings causes propeller 113 to revolve, thereby revolving RTVRD 106. Preferably, fluid outlets 114 of propeller 113 are confluent with a valve 115*a* and a static pressure-reducing device 115*b* as described in U.S. Pat. No. 3,862,035, and with a discharge valve 116. Valves 115*a* and 116 may be operated manually or automatically.

According to another embodiment (not shown), an external electro-mechanical rotator element may be fitted and connected to RTVRD 106 so as to turn it electro-mechanically.

Alternatively, the volume reduction device may be rotated manually.

Another possible embodiment of a filter according to the present invention is shown in FIGS. 6 and 7. Preferably, such embodiment is substantially as described above except that the RTVRD is solid and through its length run at least one and preferably two diametrically-opposed fluid ducts 119. Ducts 119 bear many spaced micro-vents 120 for providing fluid connection between ducts 119 and the annular liquid passage 132 between RTVRD 106 and filter element 105. The base 109 at the far end of RTVRD 106 preferably features a distribution well 118 from which liquid at high pressure is distributed to ducts 119. Preferably, a metal high pressure pipe 122 is placed centrally through hollow propeller pivot 130 and held at one end with a centering and retaining ring 123 seated in well 118 and at the other end with pivot cap 110. Thus, pipe 122 rotates together with RTVRD 106 whilst supplying high pressure fluid from an external source (not shown) through an inlet 134 defined by a pressurized liquid connector 121 to distribution well 118. When RTVRD 106 is connected to the external source and liquid at a high pressure is applied, micro-vents 120 spray the internal side of filter element 105 helping to clean it, in conjunction with the additional controlled turbulence created by the rotation of surface configured RTVRD 106, and by the increased flow caused by the opening of flushing valve 116. Preferably, each of ducts 119 features a different distribution pattern of micro-vents 120 along its longitudinal axis such that each of ducts 119 is confluent with different sections of passage 132, thereby allowing more efficient spraying of the internal side of filter element 105. The spraying fluid may be heated and special cleaning materials may be added to it so as to improve the cleaning of the filter element.

As shown in FIG. 8, such embodiment may include at least one and preferably two diametrically-opposed filter screen brushes 124 mounted in slots on RTVRD 106, at an angle of 90 degrees or any other angle to micro-vents 120. Preferably, brushes 124 are free to move towards or away from filter element 105, and feature bristles of the length suited to be in light but firm contact with the internal side of the filter element.

The embodiments shown in FIGS. 5–8 may further feature fluid connection between the wings of propeller 113 and an external high pressure liquid source, so that propeller 113 is motored by said external source.

While using a filter according to the present invention, the fluid to be processed is fed into inlet 102 of filter housing 101 from where it proceeds along the narrow annular passage 132 between the outer surface of RTVRD 106 and the internal side of filter element 105. The greater portion of the liquid passes through the perforations of filter element 105 and then out through first outlet 103 of filter housing 101. Solid particles too large to pass through filter element 105 will be carried by that portion of the liquid which flows towards passage 117 and then to optional static pressure-reducing device 115b, or will eventually accumulate on the inner face thereof.

When fluids for processing contain large quantities of solids, the flow caused by the operation of static pressure-reducing device 115b (i.e., bleed flow), may not be sufficient to prevent gradual clogging of filter element 105, particularly in the case of biological retentions.

However, while using a filter according to the present invention, continual or periodic opening of valve 116, manually or automatically, leads to a large discharge flow through outlets 114 of hydraulic propeller 113, causing it and thereby RTVRD 106 to revolve.

While using the embodiment shown in FIGS. 6 and 7, cleaning is greatly facilitated by high pressure spraying of the internal side of filter element 105 by liquid forced through micro-vents 120 during rotation of RTVRD 106. It will be clear that in this case it is possible to add special cleaning materials to the spraying fluid and that heating of the latter can apply heat to improve the cleaning of the screen when appropriate. While using the embodiment shown in FIG. 8, cleaning is assisted by brushing of the filter screen.

As will be realized, the present invention provides the basis for a solution to problems not solved by the discharge of liquid-entrained, filter-retained solids using a pressure-reducing device as described in U.S. Pat. No. 3,862,035 and by the incorporation of a volume-reduction device in filters as described in U.S. Pat. Nos. 4,966,701 and 5,076,942. Furthermore, it will be clear that the current invention and these two patents provide independent or integrated practical and economic answers to a wide range of problems in liquid filtration and separation, by providing means for reducing costs associated with regular maintenance, pressure loss, filter shut-down and investment in backup filtration, particularly in conditions where biological materials cause clogging and short filtering cycles between cleanings.

The degree of efficiency afforded by the invention also makes it very suitable for liquid and/or solid recovery in cost-conscious industrial separations in continuous processing with critical cut-off specifications.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A clog-resistant filter for separating solids from liquids, of the type wherein said liquid is passed from a filter inlet through a circular-section hollow filter element, said filter being provided with means for the discharge of collected solids during filter operation, said filter comprising:

a) a housing provided with an inlet for the liquid to be filtered and provided with a first outlet for filtrate and with a second outlet for liquid containing a high concentration of solids;

b) a cylindrical hollow filter element insertable into said housing, the internal side of said filter element being in fluid connection with said inlet and the external side of said filter element being in fluid connection with said first outlet;

c) a textured volume reduction device inserted in said filter element and being of a size and shape so as to occupy a major portion of the hollow of said filter element, said volume reduction device having a textured outer surface, said outer surface of said volume reduction device and said internal side of said filter element defining a space within said housing, wherein an incoming liquid stream, flowing in a direction parallel to the length of the cylindrical hollow filter element and in said space between said filter element and said textured outer surface of said volume reducing device, interacts with said textured surface to create a designed and controlled turbulence in a deliberate manner to prevent clogging of and for cleaning the internal side of said filter element; and d) a pressure-reduction device in fluid connection with said second outlet and provided with discharge means for solids and for the liquid in which they are entrained; whereby solid particles reaching said second extremity are swept out into said pressure-reduction device and said filter may operate for extended periods, without attention during which time clogging of the filter element is inhibited.

2. A filter according to claim 1, wherein said textured turbluence-creating outer surface is configured to allow relatively laminar flow near said first outlet and cause relatively greater and controlled turbulent flow near said second outlet.

3. A filter according to claim 1, wherein said textured surface has surface indentations.

4. A filter according to claim 1, wherein said textured surface has surface projections.

5. The filter of claim 1, wherein said second outlet of said filter is in fluid communication with a discharge valve.

6. A clog resistant filter for separating solids from liquids, of the type wherein said liquid is passed from a filter inlet through a circular-section hollow filter element, said filter being provided with means for the discharge of collected solids during filter operation, the filter comprising:
   (a) a housing provided with: an inlet for the liquid to be filtered; a first outlet for filtrate; and a second outlet for liquid containing a high concentration of solids;
   (b) a cylindrical hollow filter element inserted into said housing, the filter element having an internal side and an external side, said internal side of said filter element being in fluid communication with said inlet and said external side of said filter element being in fluid communication with said first outlet; said internal side of said filter element defining a chamber;
   (c) a textured rotatable volume reduction device inserted in said filter element and being of a size so as to occupy a portion of said chamber, said textured volume reduction device having a textured outer surface, said outer surface of said textured volume reduction device and said internal side of said filter element defining a space within said housing, wherein an incoming liquid stream, flowing in a direction parallel to the length of the cylindrical hollow filter element and in said space between said filter element and said textured outer surface of said rotatable volume reducing device, interacts with said textured surface to create a designed and controlled turbulence in a deliberate manner to prevent clogging of and for cleaning the internal side of said filter element;
   (d) a rotator element for rotating said textured volume reduction device; and
   (e) a pressure-reduction device in fluid connection with said second outlet and provided with discharge means for solids and for the liquid in which they are entrained, whereby solid particles reaching said second extremity are swept out into said pressure-reduction device and said filter may operate for extended periods, without attention during which time clogging of the filter element is inhibited.

7. A filter according to claim 6, wherein said textured surface is adapted to cause designed and controlled turbulent flow along the whole length of said filter element during filter flushing.

8. The filter of claim 6, wherein said rotator element includes an external electro-mechanical source.

9. The filter of claim 6, wherein said rotator element includes a hydraulic propeller element and an external high-pressure liquid source, the high-pressure liquid source being in fluid communication with said propeller element.

10. The filter of claim 6, wherein said textured volume reduction device is substantially cylindrical in shape.

11. The filter of claim 6, wherein said second outlet of said filter is in fluid communication with a static pressure reduction device.

12. The filter of claim 6, wherein said textured rotatable volume reduction device includes at least one closed duct, said at least one duct featuring a plurality of micro-vents in fluid communication with said outer surface of said volume reduction device, and with an external high pressure liquid source.

13. The filter of claim 12, wherein said textured rotatable volume reduction device includes two closed ducts, each placed diametrically opposite the other.

14. The filter of claim 6, wherein said textured rotatable volume reduction device features at least one slot along its length wherein at least one brush is mounted, said at least one brush being free to move towards and away from said filter element.

15. The filter of claim 14, wherein said textured rotatable volume reduction device includes two slots wherein two thin brushes are mounted, each placed opposite the other.

16. A clog resistant filter for separating solids from liquids, of the type wherein said liquid is passed from a filter inlet through a circular-section hollow filter element, said filter being provided with means for the discharge of collected solids during filter operation, the filter comprising:
   (a) a housing provided with: an inlet for the liquid to be filtered; a first outlet for filtrate; and a second outlet for liquid containing a high concentration of solids;
   (b) a cylindrical hollow filter element inserted into said housing, the filter element having an internal side and an external side, said internal side of said filter element being in fluid communication with said inlet and said external side of said filter element being in fluid communication with said first outlet; said internal side of said filter element defining a chamber;
   (c) a textured rotatable volume reduction device inserted in said filter element and being of a size so as to occupy a portion of said chamber, said textured volume reduction device and said internal side of said filter element defining a space volume reduction device and said internal side of said filter element defining a space within said housing, wherein an incoming liquid stream, flowing in said space between said filter element and said textured outer surface of said rotatable volume reducing device, interacts with said textured surface to create a designed and controlled turbulence in a deliberate manner to prevent clogging of and for cleaning the internal side of said filter element;
   (d) a rotator element for rotating said textured volume reduction device, wherein said rotator element includes a hydraulic propeller element, the propeller element including: a hollow pivot element connected to said volume reduction device and in fluid communication with said internal side of said filter element; and at least one hollow wing in fluid communication with said pivot element, said at least one wing featuring at least one aperture for evacuation of liquid therethrough, such that evacuation of liquid from said narrow space within said housing through said at least one aperture causes the propeller element to revolve, thereby revolving said-textured volume reduction device; and
   (e) a pressure-reduction device in fluid connection with said second outlet and provided with discharge means for solids and for the liquid in which they are entrained; whereby solid particles reaching said second extremity are swept out into said pressure-reduction device and said filter may operate for extended periods, without attention during which time clogging of the filter element is inhibited.

17. The filter of claim 16, wherein said propeller element is placed in a separate chamber within said housing.

18. The filter of claim 16, wherein said propeller element is placed within a separate housing.

19. The filter of claim 16, wherein said pivot element is an integral part of said textured volume reduction device.

20. The filter of claim 16, wherein said pivot element is detachably connected to said textured volume reduction device.

21. The filter of claim 16, wherein said textured rotatable volume reduction device includes at least one closed duct, said at least one duct featuring a plurality of micro-vents in fluid communication with said outer surface of said textured rotatable volume reduction device, and wherein said propeller element features a pipe installed centrally through said pivot element, said pipe being in fluid communication with said at least one duct and with an external high pressure liquid source.

22. The filter of claim 21, wherein said textured rotatable volume reduction device further features a distribution well in fluid connection with said pipe and said at least one duct.

* * * * *